US012122398B2

(12) United States Patent
Sun et al.

(10) Patent No.: US 12,122,398 B2
(45) **Date of Patent: *Oct. 22, 2024**

(54) MONITORING SYSTEM FOR AUTONOMOUS VEHICLE OPERATION

(71) Applicant: TUSIMPLE, INC., San Diego, CA (US)

(72) Inventors: Lindong Sun, San Diego, CA (US); Liu Liu, Los Altos, CA (US); Xiaoling Han, San Diego, CA (US); Yi Wang, San Diego, CA (US); Ruiliang Zhang, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 17/722,110

(22) Filed: Apr. 15, 2022

(65) Prior Publication Data

US 2022/0242425 A1 Aug. 4, 2022

Related U.S. Application Data

(63) Continuation of application No. 16/245,621, filed on Jan. 11, 2019, now Pat. No. 11,305,782.

(Continued)

(51) Int. Cl.

*B60W 50/02* (2012.01)
*G05B 23/00* (2006.01)

(Continued)

(52) U.S. Cl.

CPC ......... *B60W 50/0205* (2013.01); *G05B 23/00* (2013.01); *G05D 1/0011* (2013.01);

(Continued)

(58) Field of Classification Search

CPC . B60W 50/0205; G05B 23/00; G05D 1/0011; G05D 1/0055; G05D 1/0088; G05D 1/0282; G07C 5/008; G07C 5/0808

See application file for complete search history.

(56) References Cited

U.S. PATENT DOCUMENTS 6,084,870 A 7/2000 Wooten et al.
6,263,088 B1 7/2001 Crabtree et al.

(Continued)

FOREIGN PATENT DOCUMENTS

CN 101770211 A 7/2010
CN 101918932 A 12/2010

(Continued)

OTHER PUBLICATIONS

Australian Patent Office, 1st Examination Report for AU Appl. No. 2019206628, mailed on Sep. 26, 2023, 4 pages.

(Continued)

*Primary Examiner* — Hussein Elchanti
*Assistant Examiner* — Kenneth M Dunne
(74) *Attorney, Agent, or Firm* — Perkins Coie LLP

(57) ABSTRACT

An apparatus is provided to comprise: at least one processor and at least one memory including computer program code, the at least one memory and the computer program code configured to, with the at least one processor, cause the apparatus to: receive, from an electronic control unit of a vehicle, a test result comprising a result of a self test performed by the electronic control unit; analyze the received test result to determine a vehicle status, the vehicle status comprising a status indicator and status information to be included in a report; periodically transmit, to a remote system according to a first time period, a report including the vehicle status, a duration of the first time period being dependent on the vehicle status; receive, from the remote (Continued)

system, a control command; and in response to the control command being received, implement the control command.

20 Claims, 10 Drawing Sheets

Related U.S. Application Data

(60) Provisional application No. 62/616,363, filed on Jan. 11, 2018.

(51) Int. Cl.
*G05D 1/00* (2024.01)
*G07C 5/00* (2006.01)
*G07C 5/08* (2006.01)

(52) U.S. Cl.
CPC ......... *G05D 1/0055* (2013.01); *G05D 1/0088* (2013.01); *G05D 1/0282* (2013.01); *G07C 5/008* (2013.01); *G07C 5/0808* (2013.01)

(56) References Cited

U.S. PATENT DOCUMENTS 6,594,821 B1 7/2003 Banning et al.
6,777,904 B1 8/2004 Degner et al.
6,975,923 B2 12/2005 Spriggs
7,103,460 B1 9/2006 Breed
7,689,559 B2 3/2010 Canright et al.
7,742,841 B2 6/2010 Sakai et al.
7,783,403 B2 8/2010 Breed
7,844,595 B2 11/2010 Canright et al.
8,041,111 B1 10/2011 Wilensky
8,064,643 B2 11/2011 Stein et al.
8,082,101 B2 12/2011 Stein et al.
8,164,628 B2 4/2012 Stein et al.
8,175,376 B2 5/2012 Marchesotti et al.
8,271,871 B2 9/2012 Marchesotti
8,346,480 B2 1/2013 Trepagnier et al.
8,378,851 B2 2/2013 Stein et al.
8,392,117 B2 3/2013 Dolgov et al.
8,401,292 B2 3/2013 Park et al.
8,412,449 B2 4/2013 Trepagnier et al.
8,478,072 B2 7/2013 Aisaka et al.
8,553,088 B2 10/2013 Stein et al.
8,706,394 B2 4/2014 Trepagnier et al.
8,718,861 B1 5/2014 Montemerlo et al.
8,788,134 B1 7/2014 Litkouhi et al.
8,908,041 B2 12/2014 Stein et al.
8,917,169 B2 12/2014 Schofield et al.
8,963,913 B2 2/2015 Baek
8,965,621 B1 2/2015 Urmson et al.
8,981,966 B2 3/2015 Stein et al.
8,983,708 B2 3/2015 Choe et al.
8,993,951 B2 3/2015 Schofield et al.
9,002,632 B1 4/2015 Emigh
9,008,369 B2 4/2015 Schofield et al.
9,025,880 B2 5/2015 Perazzi et al.
9,042,648 B2 5/2015 Wang et al.
9,081,385 B1 7/2015 Ferguson et al.
9,088,744 B2 7/2015 Grauer et al.
9,111,444 B2 8/2015 Kaganovich
9,117,133 B2 8/2015 Barnes et al.
9,118,816 B2 8/2015 Stein et al.
9,120,485 B1 9/2015 Dolgov
9,122,954 B2 9/2015 Srebnik et al.
9,134,402 B2 9/2015 Sebastian et al.
9,145,116 B2 9/2015 Clarke et al.
9,147,255 B1 9/2015 Zhang et al.
9,156,473 B2 10/2015 Clarke et al.
9,176,006 B2 11/2015 Stein
9,179,072 B2 11/2015 Stein et al.
9,183,447 B1 11/2015 Gdalyahu et al.
9,185,360 B2 11/2015 Stein et al.
9,191,634 B2 11/2015 Schofield et al.
9,214,084 B2 12/2015 Grauer et al.
9,219,873 B2 12/2015 Grauer et al.
9,233,659 B2 1/2016 Rosenbaum et al.
9,233,688 B2 1/2016 Clarke et al.
9,248,832 B2 2/2016 Huberman
9,248,835 B2 2/2016 Tanzmeister
9,251,708 B2 2/2016 Rosenbaum et al.
9,277,132 B2 3/2016 Berberian
9,280,711 B2 3/2016 Stein
9,282,144 B2 3/2016 Tebay et al.
9,286,522 B2 3/2016 Stein et al.
9,297,641 B2 3/2016 Stein
9,299,004 B2 3/2016 Lin et al.
9,315,192 B1 4/2016 Zhu et al.
9,317,033 B2 4/2016 Ibanez-guzman et al.
9,317,776 B1 4/2016 Honda et al.
9,330,334 B2 5/2016 Lin et al.
9,342,074 B2 5/2016 Dolgov et al.
9,347,779 B1 5/2016 Lynch
9,355,635 B2 5/2016 Gao et al.
9,365,214 B2 6/2016 Shalom et al.
9,399,397 B2 7/2016 Mizutani et al.
9,418,549 B2 8/2016 Kang et al.
9,428,192 B2 8/2016 Schofield et al.
9,436,880 B2 9/2016 Bos et al.
9,438,878 B2 9/2016 Niebla, Jr. et al.
9,443,163 B2 9/2016 Springer
9,446,765 B2 9/2016 Shalom et al.
9,459,515 B2 10/2016 Stein
9,466,006 B2 10/2016 Duan
9,476,970 B1 10/2016 Fairfield et al.
9,483,839 B1 11/2016 Kwon et al.
9,490,064 B2 11/2016 Hirosawa et al.
9,494,935 B2 11/2016 Okumura et al.
9,507,346 B1 * 11/2016 Levinson .............. B60W 30/09
9,513,634 B2 12/2016 Pack et al.
9,531,966 B2 12/2016 Stein et al.
9,535,423 B1 1/2017 Debreczeni
9,538,113 B2 1/2017 Grauer et al.
9,547,985 B2 1/2017 Tuukkanen
9,549,158 B2 1/2017 Grauer et al.
9,555,803 B2 1/2017 Pawlicki et al.
9,568,915 B1 2/2017 Berntorp et al.
9,587,952 B1 3/2017 Slusar
9,599,712 B2 3/2017 Van Der Tempel et al.
9,600,889 B2 3/2017 Boisson et al.
9,602,807 B2 3/2017 Crane et al.
9,612,123 B1 4/2017 Levinson et al.
9,620,010 B2 4/2017 Grauer et al.
9,625,569 B2 4/2017 Lange
9,628,565 B2 4/2017 Stenneth et al.
9,649,999 B1 5/2017 Amireddy et al.
9,652,860 B1 5/2017 Maali et al.
9,669,827 B1 6/2017 Ferguson et al.
9,672,446 B1 6/2017 Vallespi-gonzalez
9,690,290 B2 6/2017 Prokhorov
9,701,023 B2 7/2017 Zhang et al.
9,712,754 B2 7/2017 Grauer et al.
9,720,418 B2 8/2017 Stenneth
9,723,097 B2 8/2017 Harris et al.
9,723,099 B2 8/2017 Chen et al.
9,723,233 B2 8/2017 Grauer et al.
9,726,754 B2 8/2017 Massanell et al.
9,729,860 B2 8/2017 Cohen et al.
9,738,280 B2 8/2017 Rayes
9,739,609 B1 8/2017 Lewis
9,746,550 B2 8/2017 Nath et al.
9,753,128 B2 9/2017 Schweizer et al.
9,753,141 B2 9/2017 Grauer et al.
9,754,490 B2 9/2017 Kentley et al.
9,760,837 B1 9/2017 Nowozin et al.
9,766,625 B2 9/2017 Boroditsky et al.
9,769,456 B2 9/2017 You et al.
9,773,155 B2 9/2017 Shotton et al.
9,779,276 B2 10/2017 Todeschini et al.
9,785,149 B2 10/2017 Wang et al.
9,805,294 B2 10/2017 Liu et al.
9,810,785 B2 11/2017 Grauer et al.

(56) References Cited

U.S. PATENT DOCUMENTS

| | | | |
|---|---|---|---|
| 9,823,339 B2 | 11/2017 | Cohen | |
| 9,953,236 B1 | 4/2018 | Huang et al. | |
| 10,147,193 B2 | 12/2018 | Huang et al. | |
| 10,223,806 B1 | 3/2019 | Luo et al. | |
| 10,223,807 B1 | 3/2019 | Luo et al. | |
| 10,410,055 B2 | 9/2019 | Wang et al. | |
| 11,305,782 B2 | 4/2022 | Sun et al. | |
| 2001/0044697 A1* | 11/2001 | Kageyama | G08G 1/207 701/482 |
| 2003/0114980 A1 | 6/2003 | Klausner et al. | |
| 2003/0174773 A1 | 9/2003 | Comaniciu et al. | |
| 2004/0264763 A1 | 12/2004 | Mas et al. | |
| 2007/0183661 A1 | 8/2007 | El-Maleh et al. | |
| 2007/0183662 A1 | 8/2007 | Wang et al. | |
| 2007/0230792 A1 | 10/2007 | Shashua et al. | |
| 2007/0286526 A1 | 12/2007 | Abousleman et al. | |
| 2008/0249667 A1 | 10/2008 | Horvitz et al. | |
| 2009/0040054 A1 | 2/2009 | Wang et al. | |
| 2009/0087029 A1 | 4/2009 | Coleman et al. | |
| 2010/0049397 A1 | 2/2010 | Liu et al. | |
| 2010/0111417 A1 | 5/2010 | Ward et al. | |
| 2010/0226564 A1 | 9/2010 | Marchesotti et al. | |
| 2010/0281361 A1 | 11/2010 | Marchesotti | |
| 2011/0142283 A1 | 6/2011 | Huang et al. | |
| 2011/0206282 A1 | 8/2011 | Aisaka et al. | |
| 2011/0247031 A1 | 10/2011 | Jacoby | |
| 2012/0041636 A1 | 2/2012 | Johnson | |
| 2012/0105639 A1 | 5/2012 | Stein et al. | |
| 2012/0140076 A1 | 6/2012 | Rosenbaum et al. | |
| 2012/0274629 A1 | 11/2012 | Baek | |
| 2012/0314070 A1 | 12/2012 | Zhang et al. | |
| 2013/0051613 A1 | 2/2013 | Bobbitt et al. | |
| 2013/0083959 A1 | 4/2013 | Owechko et al. | |
| 2013/0182134 A1 | 7/2013 | Grundmann et al. | |
| 2013/0204465 A1 | 8/2013 | Phillips et al. | |
| 2013/0266187 A1 | 10/2013 | Bulan et al. | |
| 2013/0329052 A1 | 12/2013 | Chew | |
| 2014/0072170 A1 | 3/2014 | Zhang et al. | |
| 2014/0104051 A1 | 4/2014 | Breed | |
| 2014/0142799 A1 | 5/2014 | Ferguson et al. | |
| 2014/0143839 A1 | 5/2014 | Ricci | |
| 2014/0145516 A1 | 5/2014 | Hirosawa et al. | |
| 2014/0198184 A1 | 7/2014 | Stein et al. | |
| 2014/0321704 A1 | 10/2014 | Partis | |
| 2014/0334668 A1 | 11/2014 | Saund | |
| 2015/0062304 A1 | 3/2015 | Stein et al. | |
| 2015/0120083 A1 | 4/2015 | Gurovich | |
| 2015/0269438 A1 | 9/2015 | Samarsekera et al. | |
| 2015/0310370 A1 | 10/2015 | Burry et al. | |
| 2015/0353082 A1 | 12/2015 | Lee et al. | |
| 2015/0367770 A1 | 12/2015 | Newton-Dunn | |
| 2016/0008988 A1 | 1/2016 | Kennedy | |
| 2016/0026787 A1 | 1/2016 | Nairn et al. | |
| 2016/0037064 A1 | 2/2016 | Stein et al. | |
| 2016/0094774 A1 | 3/2016 | Li et al. | |
| 2016/0117871 A1 | 4/2016 | McClellan et al. | |
| 2016/0118080 A1 | 4/2016 | Chen | |
| 2016/0129907 A1 | 5/2016 | Kim et al. | |
| 2016/0165157 A1 | 6/2016 | Stein et al. | |
| 2016/0210528 A1 | 7/2016 | Duan | |
| 2016/0275766 A1 | 9/2016 | Venetianer et al. | |
| 2016/0321381 A1 | 11/2016 | English et al. | |
| 2016/0334230 A1 | 11/2016 | Ross et al. | |
| 2016/0342837 A1 | 11/2016 | Hong et al. | |
| 2016/0347322 A1 | 12/2016 | Clarke et al. | |
| 2016/0375907 A1 | 12/2016 | Erban | |
| 2017/0053169 A1 | 2/2017 | Cuban et al. | |
| 2017/0061632 A1 | 3/2017 | Linder et al. | |
| 2017/0124476 A1 | 5/2017 | Levinson et al. | |
| 2017/0134631 A1 | 5/2017 | Zhao et al. | |
| 2017/0177951 A1 | 6/2017 | Yang et al. | |
| 2017/0301104 A1 | 10/2017 | Qian et al. | |
| 2017/0305423 A1 | 10/2017 | Green | |
| 2017/0318407 A1 | 11/2017 | Meister | |
| 2017/0365105 A1 | 12/2017 | Rao | |
| 2018/0151063 A1 | 5/2018 | Pun et al. | |
| 2018/0158197 A1 | 6/2018 | Dasgupta et al. | |
| 2018/0260956 A1 | 9/2018 | Huang et al. | |
| 2018/0283892 A1 | 10/2018 | Behrendt et al. | |
| 2018/0373980 A1 | 12/2018 | Huval | |
| 2019/0025853 A1 | 1/2019 | Julian et al. | |
| 2019/0065863 A1 | 2/2019 | Luo et al. | |
| 2019/0066329 A1 | 2/2019 | Luo et al. | |
| 2019/0066330 A1 | 2/2019 | Luo et al. | |
| 2019/0066344 A1 | 2/2019 | Yi et al. | |
| 2019/0108384 A1 | 4/2019 | Wang et al. | |
| 2019/0132391 A1 | 5/2019 | Thomas et al. | |
| 2019/0132392 A1 | 5/2019 | Liu et al. | |
| 2019/0210564 A1 | 7/2019 | Han et al. | |
| 2019/0210613 A1 | 7/2019 | Sun et al. | |
| 2019/0236950 A1 | 8/2019 | Li et al. | |
| 2019/0266420 A1 | 8/2019 | Ge et al. | |

FOREIGN PATENT DOCUMENTS

| | | | | |
|---|---|---|---|---|
| CN | 104954420 A | 9/2015 | | |
| CN | 106340197 A | 1/2017 | | |
| CN | 106781591 A | 5/2017 | | |
| CN | 107505944 A | 12/2017 | | |
| CN | 108010360 A | 5/2018 | | |
| DE | 2608513 A1 | 9/1977 | | |
| EP | 890470 B1 | 1/1999 | | |
| EP | 1754179 A1 | 2/2007 | | |
| EP | 2448251 A2 | 5/2012 | | |
| EP | 2463843 A2 | 6/2012 | | |
| EP | 2761249 A1 | 8/2014 | | |
| EP | 2946336 A2 | 11/2015 | | |
| EP | 2993654 A1 | 3/2016 | | |
| EP | 3081419 A1 | 10/2016 | | |
| KR | 100802511 B1 | 2/2008 | | |
| WO | 1991009375 A1 | 6/1991 | | |
| WO | WO-2005068262 A1 * | 7/2005 | | B60T 8/885 |
| WO | 2005098739 A1 | 10/2005 | | |
| WO | 2005098751 A1 | 10/2005 | | |
| WO | 2005098782 A1 | 10/2005 | | |
| WO | 2010109419 A1 | 9/2010 | | |
| WO | 2013045612 A1 | 4/2013 | | |
| WO | 2014111814 A2 | 7/2014 | | |
| WO | 2014166245 A1 | 10/2014 | | |
| WO | 2014201324 A1 | 12/2014 | | |
| WO | 2015083009 A1 | 6/2015 | | |
| WO | 2015103159 A1 | 7/2015 | | |
| WO | 2015125022 A2 | 8/2015 | | |
| WO | 2015186002 A2 | 12/2015 | | |
| WO | 2016090282 A1 | 6/2016 | | |
| WO | 2016135736 A2 | 9/2016 | | |
| WO | 2017013875 A1 | 1/2017 | | |
| WO | 2017079349 A1 | 5/2017 | | |
| WO | 2017079460 A2 | 5/2017 | | |
| WO | 2019040800 A1 | 2/2019 | | |
| WO | 2019084491 A1 | 5/2019 | | |
| WO | 2019084494 A1 | 5/2019 | | |
| WO | 2019140277 A2 | 7/2019 | | |
| WO | 2019168986 A1 | 9/2019 | | |

OTHER PUBLICATIONS

Caselitz, T. et al., "Monocular camera localization in 3D LiDAR maps," European Conference on Computer Vision (2014) Computer Vision—ECCV 2014. ECCV 2014. Lecture Notes in Computer Science, vol. 8690. Springer, Cham.

Mur-Artal, R. et al., "ORB-SLAM: A Versatile and Accurate Monocular SLAM System," IEEE Transaction on Robotics, Oct. 2015, pp. 1147-1163, vol. 31, No. 5, Spain.

Sattler, T. et al., "Are Large-Scale 3D Models Really Necessary for Accurate Visual Localization?" CVPR, IEEE, 2017, pp. 1-10.

Engel, J. et la. "LSD-SLAM: Large Scare Direct Monocular SLAM," pp. 1-16, Munich.

Levinson, Jesse et al., Experimental Robotics, Unsupervised Calibration for Multi-Beam Lasers, pp. 179-194, 12th Ed., Oussama Khatib, Vijay Kumar, Gaurav Sukhatme (Eds.) Springer-Verlag Berlin Heidelberg 2014.

(56) References Cited

OTHER PUBLICATIONS

International Application No. PCT/US2019/013322, International Search Report and Written Opinion Mailed Apr. 2, 2019.
International Application No. PCT/US19/12934, International Search Report and Written Opinion Mailed Apr. 29, 2019.
International Application No. PCT/US18/53795, International Search Report and Written Opinion Mailed Dec. 31, 2018.
International Application No. PCT/US18/57484, International Search Report and Written Opinion Mailed Jan. 7, 2019.
International Application No. PCT/US2018/057851, International Search Report and Written Opinion Mailed Feb. 1, 2019.
International Application No. PCT/US2019/019839, International Search Report and Written Opinion Mailed May 23, 2019.
International Application No. PCT/US19/25995, International Search Report and Written Opinion Mailed Jul. 9, 2019.
Geiger, Andreas et al., "Automatic Camera and Range Sensor Calibration using a single Shot", Robotics and Automation (ICRA), pp. 1-8, 2012 IEEE International Conference.
Zhang, Z. et al. A Flexible new technique for camera calibration. IEEE Transactions on Pattern Analysis and Machine Intelligence (vol. 22, Issue: 11, Nov. 2000).
International Application No. PCT/US2018/047830, International Search Report and Written Opinion Mailed Apr. 27, 2017.
Bar-Hillel, Aharon et al. "Recent progress in road and lane detection: a survey." Machine Vision and Applications 25 (2011): 727-745.
Schindler, Andreas et al. "Generation of high precision digital maps using circular arc splines," 2012 IEEE Intelligent Vehicles Symposium, Alcala de Henares, 2012, pp. 246-251. doi: 10.1109/IVS.2012.6232124.
International Application No. PCT/US2018/047608, International Search Report and Written Opinion Mailed Dec. 28, 2018.
Hou, Xiaodi and Zhang, Liqing, "Saliency Detection: A Spectral Residual Approach", Computer Vision and Pattern Recognition, CVPR'07—IEEE Conference, pp. 1-8, 2007.
Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.
Hou, Xiaodi and Zhang, Liqing, "Dynamic Visual Attention: Searching for Coding Length Increments", Advances in Neural Information Processing Systems, vol. 21, pp. 681-688, 2008.
Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302.5985, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv: 1603.04779, 2016.
Li, Yanghao and Wang, Naiyan and Liu, Jiaying and Hou, Xiaodi, "Demystifying Neural Style Transfer", arXiv preprint arXiv:1701.01036, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv: 1702.08502, 2017.
Li, Yanghao and Wang, Naiyan and Liu, Jiaying and Hou, Xiaodi, "Factorized Bilinear Models for Image Recognition", arXiv preprint arXiv: 1611.05709, 2016.
Hou, Xiaodi, "Computational Modeling and Psychophysics in Low and Mid-Level Vision", California Institute of Technology, 2014.
Spinello, Luciano, Triebel, Rudolph, Siegwart, Roland, "Multiclass Multimodal Detection and Tracking in Urban Environments", Sage Journals, vol. 29 Issue 12, pp. 1498-1515 Article first published online: Oct. 7, 2010; Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.
Kyoungho Ahn, Hesham Rakha, "The Effects of Route Choice Decisions on Vehicle Energy Consumption and Emissions", Virginia Tech Transportation Institute, Blacksburg, VA 24061, date unknown.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv: 1612.06573v1 [cs.CV] Dec. 20, 2016.
Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv: 1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.
Macaodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv: 1703.04977v1 [cs.CV] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, Ca, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtaINIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/Suspension System

(56) References Cited

OTHER PUBLICATIONS

While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
Office Action Mailed in Chinese Application No. 201810025516.X, Mailed Sep. 3, 2019.
Luo, Yi et al. U.S. Appl. No. 15/684,389 Notice of Allowance Mailed Oct. 9, 2019.
European Application No. 19738646.9/3738106 Extended European Search Report Mailed Aug. 9, 2021, pp. 1-8.
M.P.Singh, Prabhat Kumar, "An Efficient Forward Error Correction Scheme for Wireless Sensor Network", 2011, Elsevier, p. 1 (Year: 2011).
Carle, Patrick J.F., "Global Rover Localization by Matching Lidar and Orbital 3D Maps.", IEEE, Anchorage Convention Distriction, pp. 1-6, May 3-8, 2010. (Anchorage Alaska, US), May 3-8, 2019.

* cited by examiner

MONITORING SYSTEM FOR AUTONOMOUS VEHICLE OPERATION

CROSS-REFERENCE TO RELATED APPLICATIONS

This patent document is a continuation of and claims the priority and benefits of U.S. patent application Ser. No. 16/245,621, entitled "MONITORING SYSTEM FOR AUTONOMOUS VEHICLE OPERATION" and filed Jan. 11, 2019 and which claims priority to and the benefits of U.S. Provisional Patent Application No. 62/616,363 filed on Jan. 11, 2018, which is incorporated herein by reference in its entirety.

TECHNICAL FIELD

This document relates to vehicle monitoring and control.

BACKGROUND

Autonomous vehicle navigation is a technology for sensing the position and movement of a vehicle, and based on the sensing, autonomously controlling the vehicle to navigate to a destination. Autonomous vehicle navigation can have important applications in the transportation of people, goods and services.

SUMMARY

Disclosed are devices, systems and methods for a monitoring system for autonomous operation of a vehicle, such as a passenger car or a truck. The monitoring system may be configured to transmit control commands that can override the local commands of the vehicle in order to ensure passenger and vehicular safety. This may be achieved by combining information from multiple resources on or near the vehicle, and periodically reporting this information to the monitoring system over a reliable communication network.

In one aspect, the disclosed technology can be used to provide a method for monitoring and controlling a vehicle. This method, which may be implemented at the vehicle, includes periodically generating, with a first period, a report; periodically transmitting, with a second period, the report to a remote monitor center; receiving a control command from the remote monitor center; and implementing the control command from the remote monitor center when the control command has a high priority, wherein an implementation of the control command overrides an implementation of a local control command, and wherein the control command is selected from a predetermined set of control commands.

In another aspect, the disclosed technology can be used to provide a method for monitoring and controlling a vehicle. This method, which may be implemented at a remote monitor center includes periodically receiving, from the vehicle, a report; determining whether the report comprises any immediately actionable status indicators; selecting a control command from a predetermined set of control commands; and transmitting, to the vehicle, the control command with a high priority when the report comprises at least one immediately actionable status indicator, and wherein an implementation of the control command with the high priority at the vehicle overrides an implementation of a local control command at the vehicle.

In another aspect, the disclosed technology can be used to provide a method for monitoring and controlling a vehicle. This method, which may be implemented at the vehicle, includes: collecting status information from one or more systems implemented in the vehicle; classifying the status information by a plurality of status indicators including one or more critical status indicators and one or more uncritical status indicators; generating a critical status report based on the status information associated with the one or more critical status indicators immediately upon receipt of such status information; and generating an uncritical status report based on the status information associated with the one or more uncritical status indicators with a period that varies with the one or more uncritical status indicators.

In another aspect, the disclosed technology can be used to provide a method for monitoring and controlling a vehicle. This method, which may be implemented at the vehicle, includes: collecting status information from one or more systems implemented in the vehicle; classifying the status information by a plurality of status indicators including a warning status indicator, an error status indicator, and a fatal status indicator; generating periodically a status report based on the status information associated with the warning status indicators; generating, upon receipt of status information associated with the fatal status indicator, a status report based on the status information associated with the fatal status indicator immediately; performing, upon receipt of status information associated with the error status indicator, a recovering process on a corresponding system, and, if the recovering process is unsuccessful, generating a status report based on the status information associated with the error status indicator; and sending the generated status report to an external monitoring system.

In another aspect, the disclosed technology can be used to provide a computer apparatus that includes a processor configured to implement a method disclosed in this patent document.

In another aspect, the disclosed technology can be used to provide a computer readable program medium having code stored thereupon, the code, when executed by a processor, causing the processor to implement a method disclosed in this patent document.

The above and other aspects and features of the disclosed technology are described in greater detail in the drawings, the descriptions and the claims.

DETAILED DESCRIPTION

Disclosed are devices, systems and methods that can be used for embodiments of a monitoring system for autonomous vehicle operation.

The operation of an autonomous vehicle may involve minimal driver interaction, or no driver at all, but the safety of the passengers is paramount. To ensure the safety of the vehicle and the passengers, the vehicle status and driving and environmental conditions may be continuously monitored. The monitoring may be performed both locally and in a remote monitor center. This may provide the advantage that error handling can be immediately enabled under different scenarios.

The disclosed technology in this patent document provides solutions that can be used to address the above and other technical issues in remote monitoring and controlling the operation of vehicles.

Figure 1:
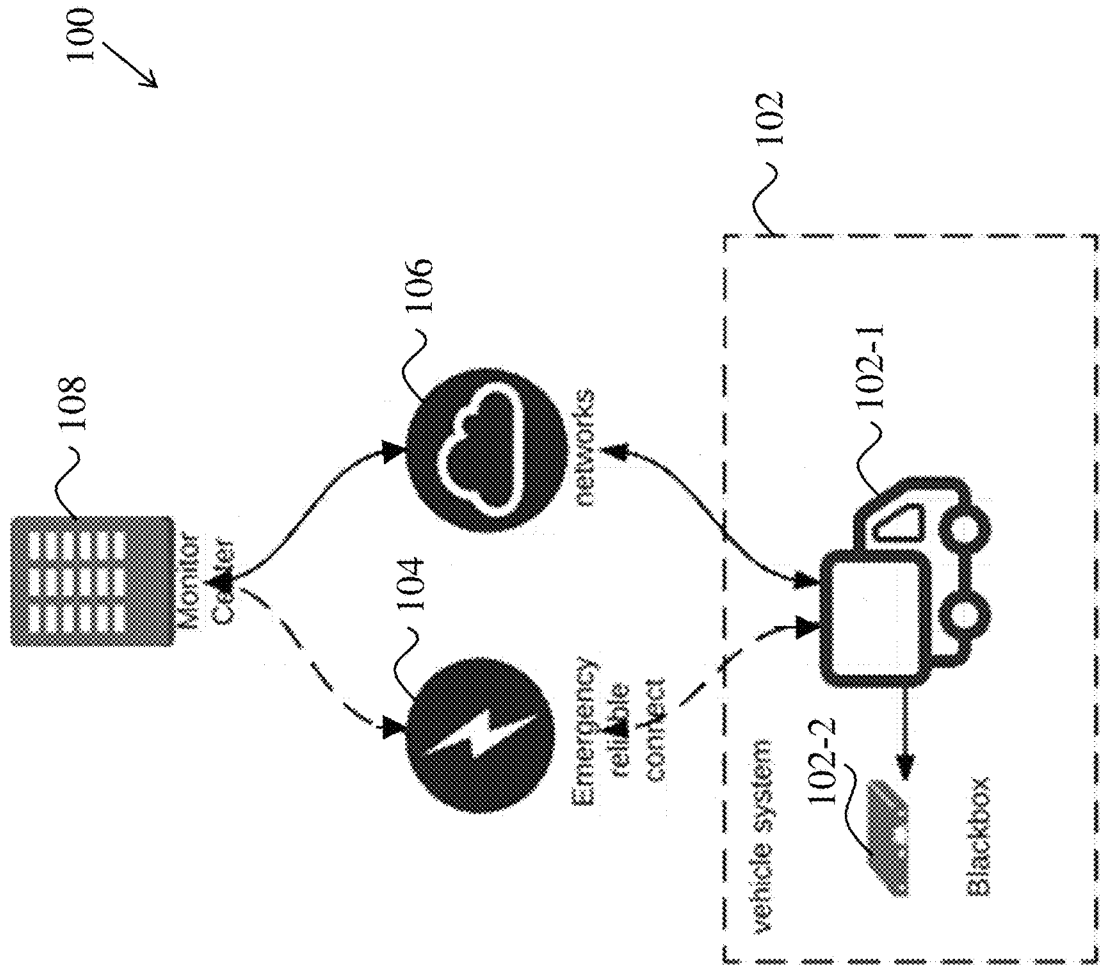
FIG. 1 shows a block diagram of an example of the system architecture for vehicular wireless communication, including monitoring and controlling autonomous vehicle operation.

FIG. 1 shows a block diagram of an example of the system architecture for vehicular wireless communication and monitoring of autonomous vehicle operation. In an example, the vehicle system 102 includes the vehicle 102-1 and a black box 102-2. The black box 102-2 may be, for example, a storage unit that stores data and reports that the vehicle generates. The black box 102-2 may as also store local and remote control commands that are used to operate the vehicle. In some embodiments, contents of the black box 102-2 may be periodically used to improve the autonomous and monitoring operations of the system.

In addition to the vehicle system 102, the system architecture may include the remote monitor center 108 and at least two communication channels that the vehicle 102-1 may use to transmit messages, various reports or data to the remote monitor center 108. The first channel may be a bidirectional (two-way) high-speed channel 106 for regular (e.g., periodic) data transfers. The second channel may be a unidirectional (one-way, vehicle to remote monitor center) or bidirectional reliable channel 108. The second channel may only be used for emergency situations. One of the advantages of the embodiment shown in FIG. 1 is the presence of redundant channels, which increases the probability that reports and status indicators transmitted from the vehicle are received by the remote monitor center.

In various embodiments, the high-speed channel 106 may employ protocols such as Long-Term Evolution (LTE), Wi-Fi, IEEE 802.11, Bluetooth, Dedicated Short-Range Communication (DSRC), Communication Air-interface Long and Medium range (CALM), and other transmission protocols that may have been designed for Intelligent Transportation System (ITS) implementations.

In some embodiments, the reliable channel 108 may employ a low-rate forward error-correcting (FEC) code or retransmissions to ensure robust communication even when adverse conditions are present over the wireless channels. In some embodiments, the reliable channel 108 may employ protocols or physical layer (PHY) waveforms that leverage one or more of frequency, time, space or code diversity.

Figure 2:
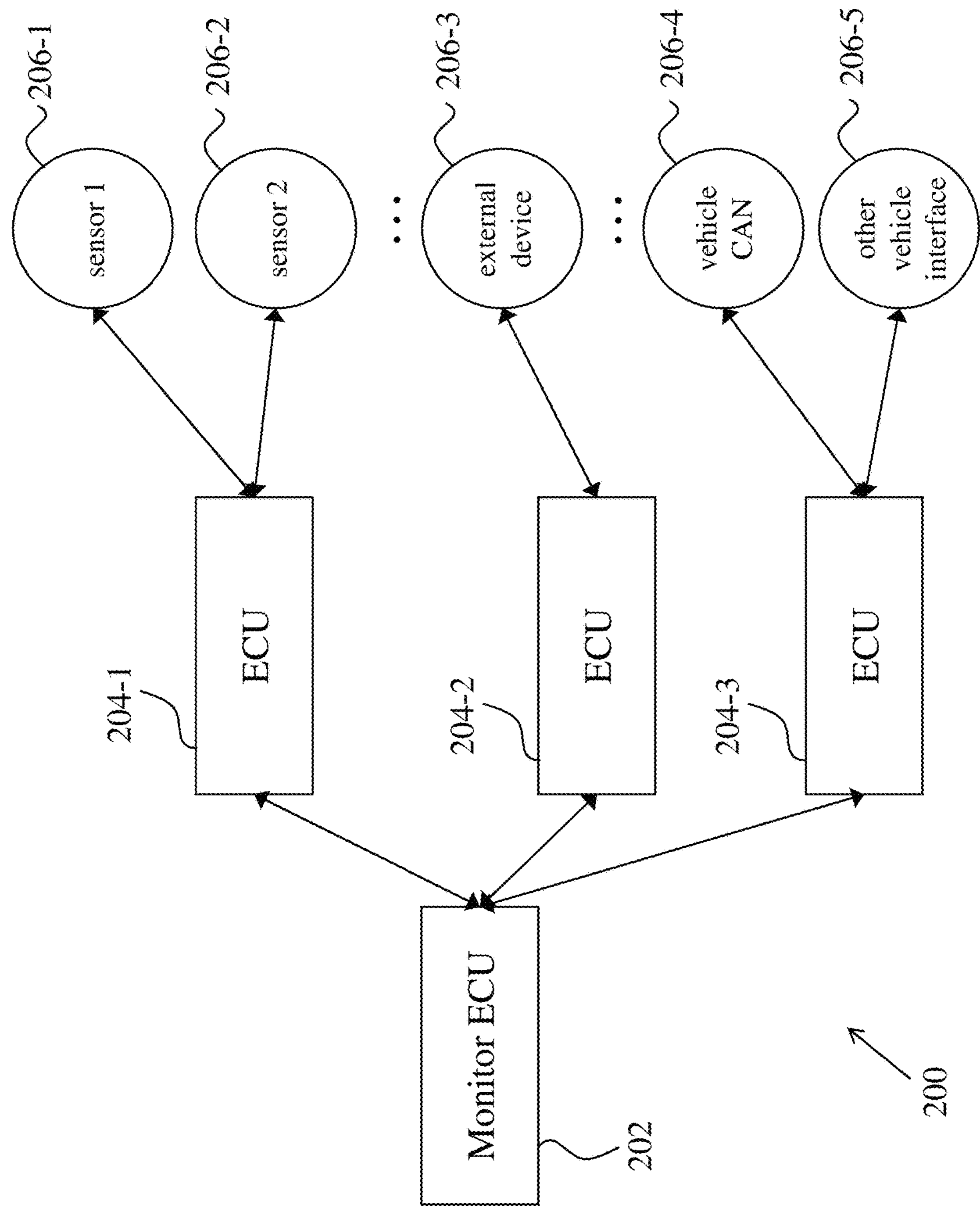
FIG. 2 shows a block diagram of an example of the vehicular components that may support a monitoring system for autonomous vehicle operation.

FIG. 2 shows a block diagram of an example of the vehicular components that may support a monitoring system for autonomous vehicle operation. In some embodiments, a vehicle hardware system may include multiple electronic control units (ECUs), denoted 204-1, 204-2 and 204-3 in FIG. 2, each of which may control multiple sensors, devices and interfaces. For example, an ECU 204-1 may control at least a first sensor 206-1 and a second sensor 206-2, whereas another ECU 204-2 may control an external device 206-3, and yet another ECU 204-3 may control a vehicle controller area network (CAN) 206-4 and an alternate vehicle interface 206-5. The combinations described in FIG. 2 are not meant to be limiting, and it is understood that an ECU may control any number of sensors, devices or interfaces.

In some embodiments, the sensors controlled by an ECU may include one or more of a Global Positioning System (GPS) sensor, a radar sensor, a LIDAR (light detection and ranging) sensor, an ultrasonic sensor, and a camera (or CMOS image sensor). An ECU and its respective sensors, devices or interfaces engage in two-way communication, which enables the ECU to receive data from the sensors and transmit commands to the sensors.

Some of the ECUs (204-1, 204-2 and 204-3) may include at least one hardware system (or sub-system) and at least one software system. Some ECUs may support self-tests for these systems and sub-systems. Furthermore, if the ECU is controlling any external sensors, devices or interfaces, it may typically include the self-tests for those external sensors, devices or interfaces, respectively. In an example, the ECU that is connected to the vehicle collects information on the vehicle itself.

The analyses of these self-tests result in the generation of reports. In some embodiments, the ECUs may analyze the data generated from self-tests and generate reports based on the analysis. Reports from the ECUs are collected by the monitor ECU 202. In some embodiments, the individual ECUs (204-1, 204-2 and 204-3) may analyze the results of its own self-tests and send the report to the monitor ECU 202. In other embodiments, the individual ECUs may send the raw data to the monitor ECU, which then analyzes the raw data to generate results and reports. In the latter embodiments, the raw data from sensors controlled by different ECUs may be combined prior to analysis to provide reports at a higher systems level, and which cannot be generated by the individual ECUs.

Figure 3:
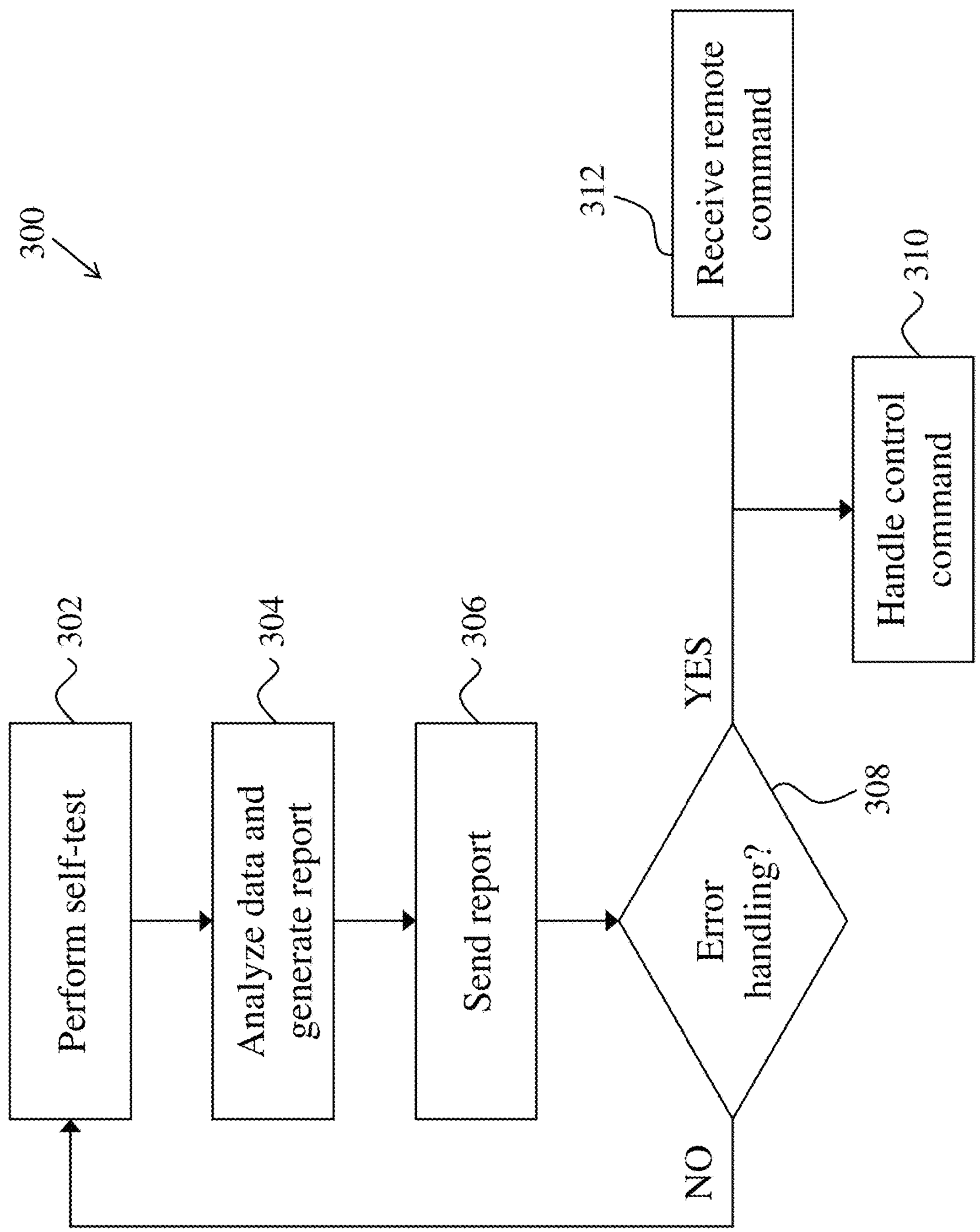
FIG. 3 shows a flow diagram for an example method of a monitoring system for autonomous vehicle operation.

FIG. 3 shows a flow diagram for an example method 300 of a monitoring operation for autonomous vehicle operation. At step 302, a vehicle may perform one or more self-tests for each of the ECUs in that vehicle. As discussed herein, the self-tests are performed by each ECU for its hardware and software systems, as well as for all the sensors, devices and interfaces under its control. In some embodiments, a sensor self-test may include collecting data and comparing it to a baseline to ensure that the sensor is operating as intended. Self-tests may include measuring the state of the vehicle, e.g. position, velocity, acceleration, and checking the measured values against predetermined thresholds to verify normal operating conditions. The thresholds may be updated based on current driving and environmental conditions.

At step 304, the data from the self-tests may be analyzed, either at the respective ECU or at the monitor ECU, as described in the context of FIG. 2. In some embodiments, the analysis of the data may result in the determination of a status, or a status indicator. Based on the status, a report comprising specific information elements may be generated. The information or data included in a report may be based on the status indicator. The status indicators may have levels or tiers, as shown in the example table below:

| Status | Data in report |
|---|---|
| OK | Basic vehicle (dynamic) information; e.g. location, fuel level, engine temperature, etc. |
| Warning | Warning messages and logs |
| Error | Error logs |
| Fatal | Sensor data that may identify the fatal condition |

As seen in the above example table, the size of the report generated may depend on the status. The transmitted report when the status is "OK" may include basic information for vehicle operation (dynamic or current state), and is typically much smaller than the report transmitted when the status is "Fatal," in which case the report may include the raw data from the sensor that has identified the fatal condition.

Furthermore, in some embodiments, a message with a certain status may transmit a report with the data indicated in the table above, as well as the data from the rows above it. For example, if the status is "Error," then the report may include the error logs, as well as the warning messages and logs, and the basic information for vehicle operation associated with the "OK" status. This may enable the remote monitor center to better analyze a potential issue since more data is readily available.

At step 306, the report that was generated is transmitted to the remote monitor center. As discussed previously, the report may be sent on at least one of a high-speed channel and a reliable channel. In some embodiments, the report may also be stored on a local storage device.

In some embodiments, the report may be partitioned using a partitioning scheme and different portions may be transmitted over different channels. For example, if the status is "Warning," and the vehicle has selected to send the basic information for vehicle operation in addition to the warning messages and logs, it may send the former ("OK" status information) over the high-speed channel and the latter ("Warning" status information) over the reliable channel.

At step 308, the vehicle determines whether error handling is required based on the status that was determined at step 304. In some embodiments, when the status indicator is "OK" or "Warning," no error handling is required (the "NO" path in FIG. 3), and operation of the monitoring system returns to step 302. In contrast, if the status indicator is "Error" or "Fatal," it is then determined that error handling is warranted (the "YES" path in FIG. 3).

At step 310, the vehicle may take measures to recover from the causes that led to the "Error" or "Fatal" status indicators. In an example, if the error message indicated that a particular sensor, which is required for autonomous operation of the vehicle, was not functioning properly, a reboot command to those sensors may be sent. In the case where the sensor does not return to normal operation or is the cause of a "Fatal" status indicator, a series of commands to have the vehicle park in a safe place may be issued.

At step 312, which may occur at any point in the timeline after step 306 and before the completion of step 310, a remote command is received from the remote monitor center. The remote command may be received based on the remote monitor center analyzing the report transmitted by the vehicle, and determining that a certain action must be taken to ensure passenger and vehicular safety. In some embodiments, the remote command has a higher priority than the local commands being issued by the vehicle. In some embodiments, the higher priority may guarantee that the remote command is executed, and would result in the implementation of the remote command overriding the implementation of any of the local commands.

Like with any other computer-implemented technologies, the remote monitor center may be susceptible to hacking, and thus the number and content of the remote commands that may be issued is limited. For example, only commands that decelerate the vehicle and bring it safely to a stop may be issued by the remote monitor center. This may, for example, ensure that hacking the remote monitor center would never result in the vehicle being involved in an adverse high-speed situation. The predetermined set of control commands that are issued by the remote monitor center may be updated for different environmental and driving conditions.

Figure 4A:
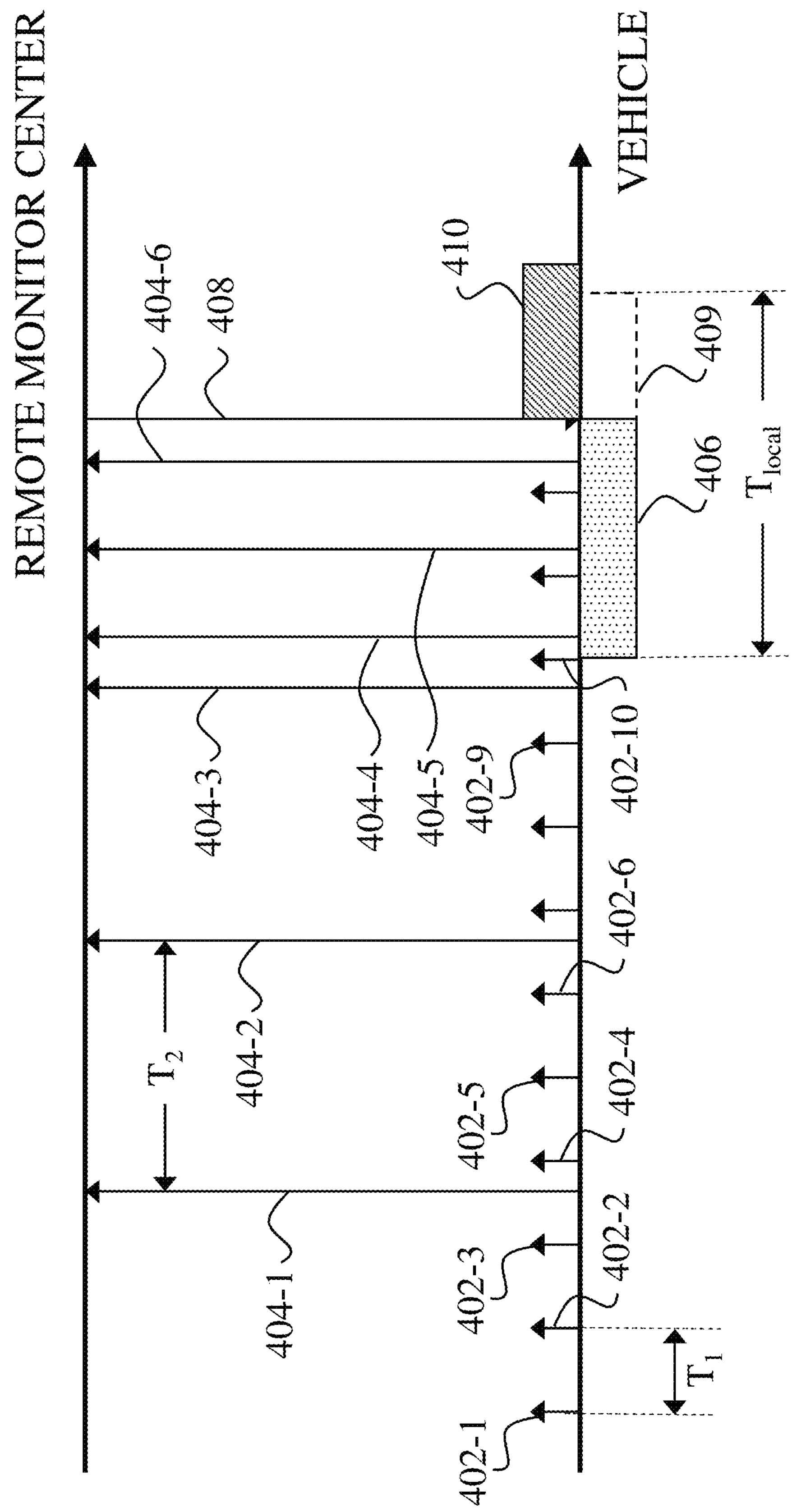
FIGS. 4A and 4B show two example timelines of operation of a monitoring system for autonomous vehicle operation.
Figure 4B:
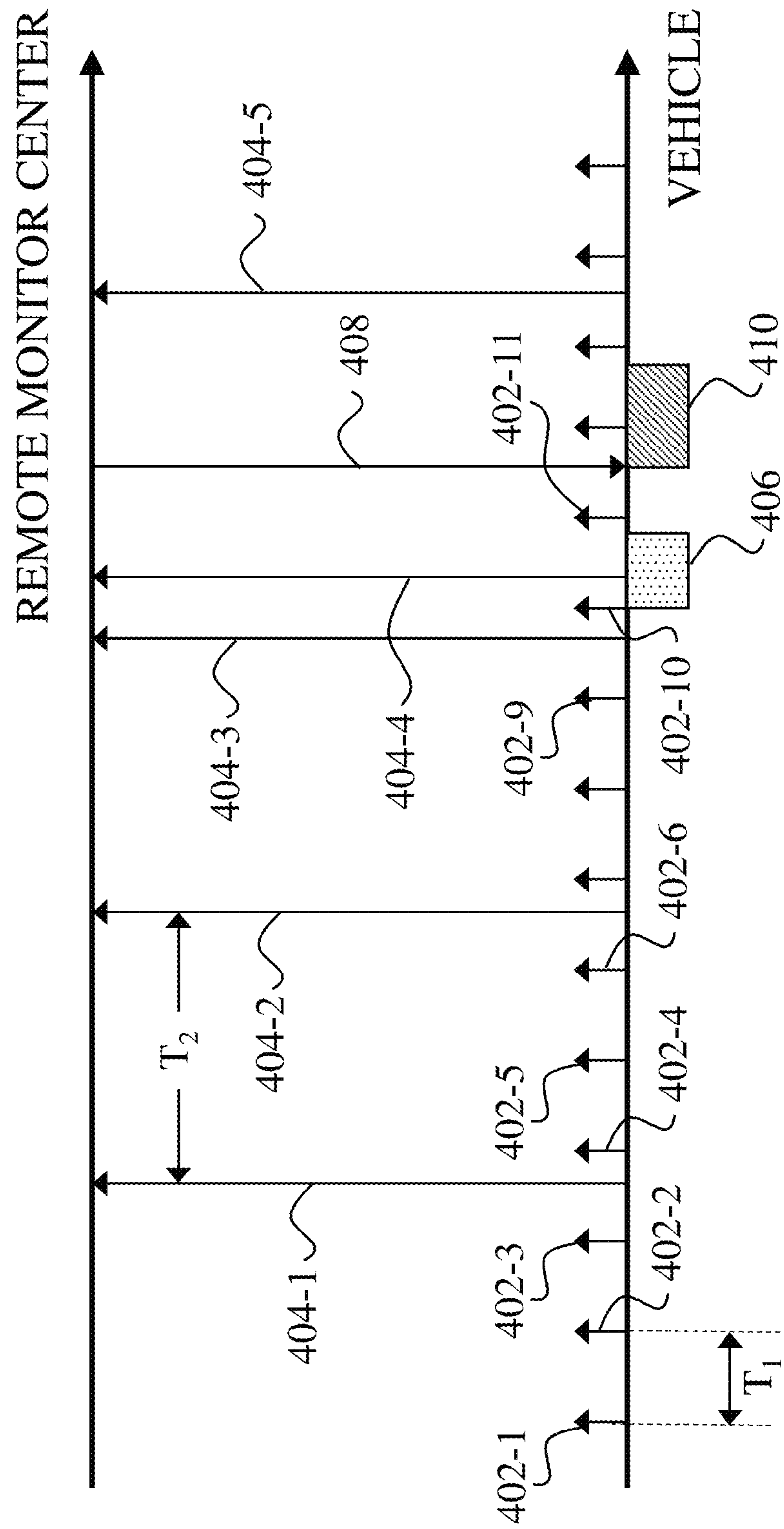

FIGS. 4A and 4B show two example timelines of operation of a monitoring system for autonomous vehicle operation. These figures comprise common steps, elements or features, which will not be explicitly described in the context of each figure.

As shown in FIG. 4A, the vehicle generates a report (402-1, 402-2, 402-3, . . . ) at a period $T_1$. In an example, the vehicle transmits a report (404-1, 404-2, 404-3), with a second period $T_2$, to the remote monitor center when the status of the report is "OK" in reports 402-1 through 402-9. The generated report 402-10 is assumed to have a "Fatal" status indicator, and the corresponding report is immediately transmitted (404-4) to the remote monitor center. In response to the "Fatal" status indicator, the vehicle issues local control commands in an effort to mitigate the situation. The local commands are executed (406) starting at the generation of the "Fatal" status indicator. It is further assumed that the local control commands have an execution time $T_{local}$, as shown in FIG. 4A.

Subsequent reports that are generated at the vehicle continue to have a "Fatal" status indicator, and continue to be transmitted (404-5 and 404-6) to the remote monitor center. At some later time (408), a control command is received from the remote monitor center. This remote control command has a higher priority than the local commands issues by the vehicle. As a result, the execution of the remote control command overrides the execution of the local control commands. As shown in FIG. 4A, the remaining time (409) of $T_{local}$ is not executed, but rather the remote control command execution (410) commences.

In the example timeline shown in FIG. 4B, it is assumed that the report 402-10 has an "Error" status indicator, which results in the report being immediately transmitted (404-4) to the remote monitor center. Local commands issued by the vehicle to mitigate the situation are executed (406), commencing at the generation of the report 402-10. In this example, the local commands resolve the situation prior to the generation of the next report 402-11, which is generated with an "OK" status indicator.

Control commands from the remote monitor center are subsequently received (408). In an example, the remote control commands are identical to the local control commands, and are not executed since they are not currently necessary. In another example, the remote control commands are different from the previously issued local control commands, and the vehicle executes them (410). However, there is no overriding of local commands since their execution has been completed.

Figure 5:
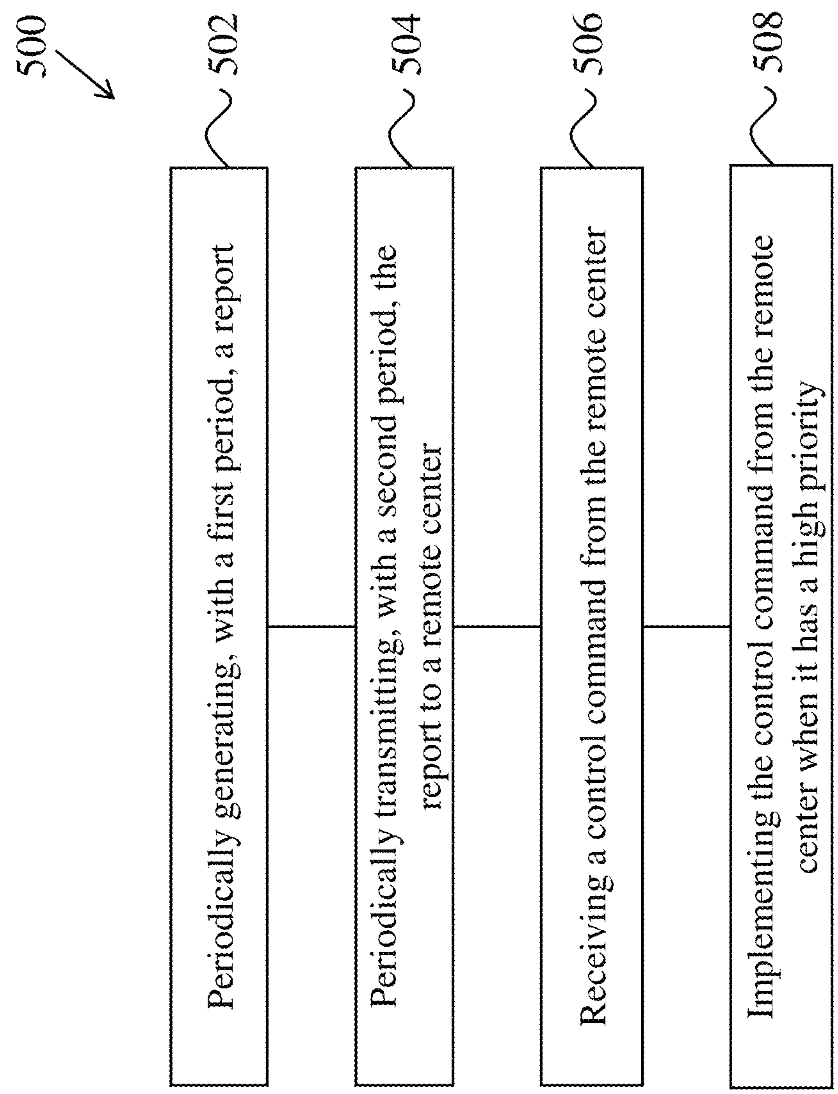
FIG. 5 shows a flowchart of an example method, which may be implemented in a vehicle, for monitoring autonomous vehicle operation.

FIG. 5 shows a flowchart of an example method 500 that may be implemented in a vehicle, for monitoring autonomous vehicle operation. The method 500 includes, at step 502, periodically generating a report with a first period. In some embodiments, the first period is very short, and the report is generated at the vehicle at a high frequency to ensure a rapid response to any adverse condition that may arise. Examples of adverse conditions may include the detection of unknown environments (e.g., a construction zone, scene of an accident), hazardous weather conditions or a loss of communication with the remote monitor center.

The method 500 includes, at step 504, periodically transmitting the report to a remote monitor center with a second period. The second period is typically longer than or equal to the first period. In some embodiments, the second period may be based on the status indicator. For example, a report corresponding to the "OK" status will be sent at a lower frequency than the report associated with the "Warning" status. Similarly, for the "Error" and "Fatal" status indicators, the report may be sent as soon as it is generated, in which case the second period is equal to the first period.

The method 500 includes, at step 506, receiving a control command from the remote monitor center. The control command is received in response to the remote monitor center receiving the periodically transmitted report. In some embodiments, the remote monitor center issues commands to the vehicle based on the report, which may include data from one or more sensors, as well as reports from other vehicles.

The method 500 includes, at step 508, implementing the control command from the remote monitor center when it has a high priority. In some embodiments, the control command received may have a high priority when the recently transmitted report included a "Error" or "Fatal" status indicator. The received control command may instruct the vehicle to take precautionary measures to ensure passenger and vehicular safety, and are able to override the local commands the vehicle is currently executing.

In some embodiments, control commands received from the remote monitor center with a high priority may initialize an emergency parking module, which may include instructions to determine the best way to reduce the vehicle's velocity until it comes to a complete stop. In other embodiments, the vehicle may also continue to frequently transmit its status during this process to the remote monitor center over the reliable channel. If communication to the remote monitor center has been compromised, the vehicle may choose to send its status to another vehicle that does have a connection to the remote monitor center.

In an example, a "Fatal" status indicator may be generated in a report if a tire sensor senses that there is a leak in one of the tires. This report is immediately transmitted to the remote monitor center. Since passenger safety is paramount, the vehicle issues local control commands to decelerate and move toward the closest servicing station. The planned route may be based on archived maps stored on the vehicle's local storage.

The remote monitor center receives the report with the "Fatal" status indicator and the data from the tire sensor. Based on the report and the data, it also determines that deceleration and immediate servicing are warranted.

However, since the remote monitor center may be communicating with other vehicles, it notices that there is significant gridlock due to an accident on the route to the closest servicing station. Thus, the remote monitor center issues a command with high priority to decelerate and divert to a servicing station that is further away than the closest servicing station. When this command is received by the vehicle, it may override the local control commands and the vehicle will now proceed to the servicing station indicated by the remote monitor center.

Figure 6:
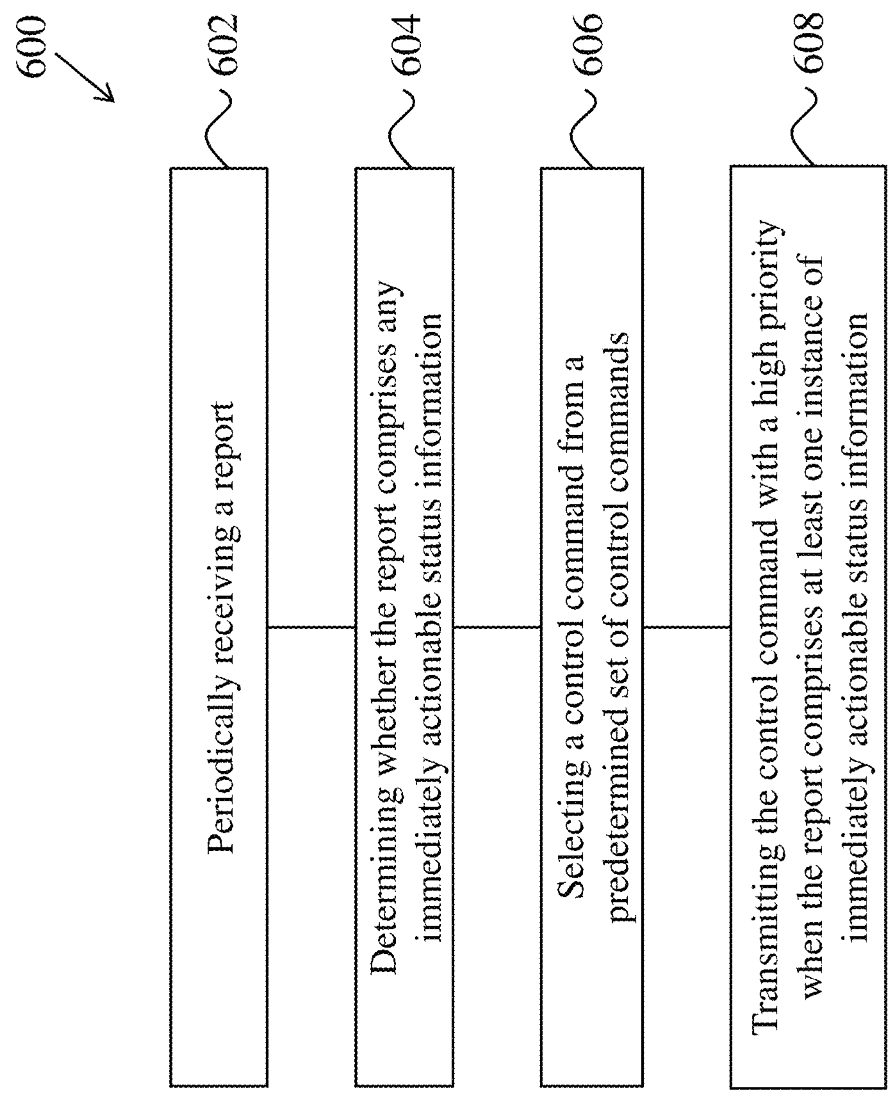
FIG. 6 shows a flowchart of another example method, which may be implemented in a remote monitor center, for monitoring autonomous vehicle operation.

FIG. 6 shows a flowchart of another example method 600 that may be implemented in a remote monitor center, for monitoring autonomous vehicle operation. The method 600 includes, at step 602, periodically receiving a report from a vehicle that is being monitored by the remote monitor center. In some embodiments, the frequency at which the reports are received may depend on the status indicators contained within the reports.

In other embodiments, the remote monitor center may request that the vehicle transmit the report at a frequency that is different from the frequency typically associated with the existing status indicator. Since the remote monitor center may be monitoring and controlling multiple vehicles in an area, it has a higher system-level view that an individual vehicle may not have, and may therefore request more frequency reporting if the probability of an adverse situation arising is higher than normal.

In yet other embodiments, the remote monitor center may determine the reporting frequency on a history of status indicators and report for that vehicle. In an example, the history that is considered may span hours, days or weeks, and may be implemented using a sliding window function to give greater weight to more recent status indicators.

The method 600 includes, at step 604, determining whether the report comprises any immediately actionable status information. In some embodiments, the "Error" and "Fatal" status indicators may be flagged as immediately actionable. In other embodiments, and in the presence of other possible environmental factors, the "Warning" status may be flagged as immediately actionable. If it is determined that the report includes at least one immediately actionable status information, the control command that is transmitted at step 508 may be done with high priority.

The method 600 includes, at step 606, selecting a control command from a predetermined set of control commands. Since the remote monitor center may be susceptible to hacking, the number and types of commands that the remote monitor center are limited to ensure that a compromised remote monitor center does not adversely affect one or more vehicles under its control. In an example, the predetermined set of control commands may include procedures for defensive driving and bringing the vehicle to a stop. This would ensure that an adverse high-speed situation involving the vehicle is avoided.

The method 600 includes, at step 608, transmitting the control command with a high priority when the report comprises at least one instance of one immediately actionable status information. In some embodiments, the control command with the high priority flag may override any local control commands that the vehicle has issued or is executing in response to the "Error" or "Fatal" status indicator that was transmitted in the report to the remote monitor center.

Figure 7:
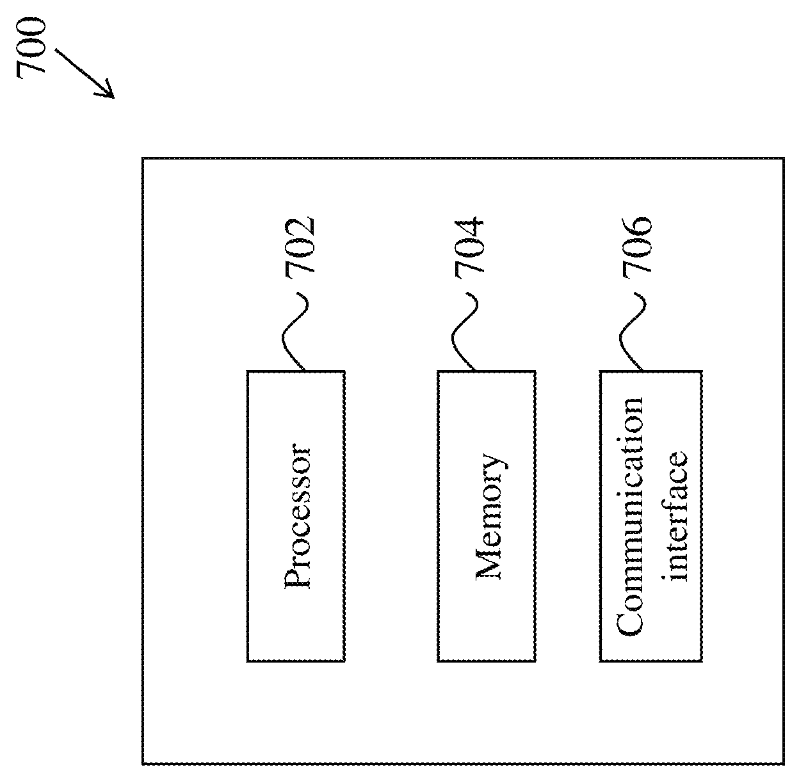
FIG. 7 shows an example of a hardware platform that can implement some techniques described in the present document.

FIG. 7 shows an example of a hardware platform 700 that can be used to implement some of the techniques described in the present document. For example, the hardware platform 700 may implement the methods 500 or 600 or may implement the various modules described herein. The hardware platform 700 may include a processor 702 that can execute code to implement a method. The hardware platform 700 may include a memory 704 that may be used to store processor-executable code and/or store data. The hardware platform 700 may further include a communication interface 706. For example, the communication interface 706 may implement communication protocols for one or both of a high-speed channel for regular data transfer or a reliable channel for emergency situations.

Figure 8:
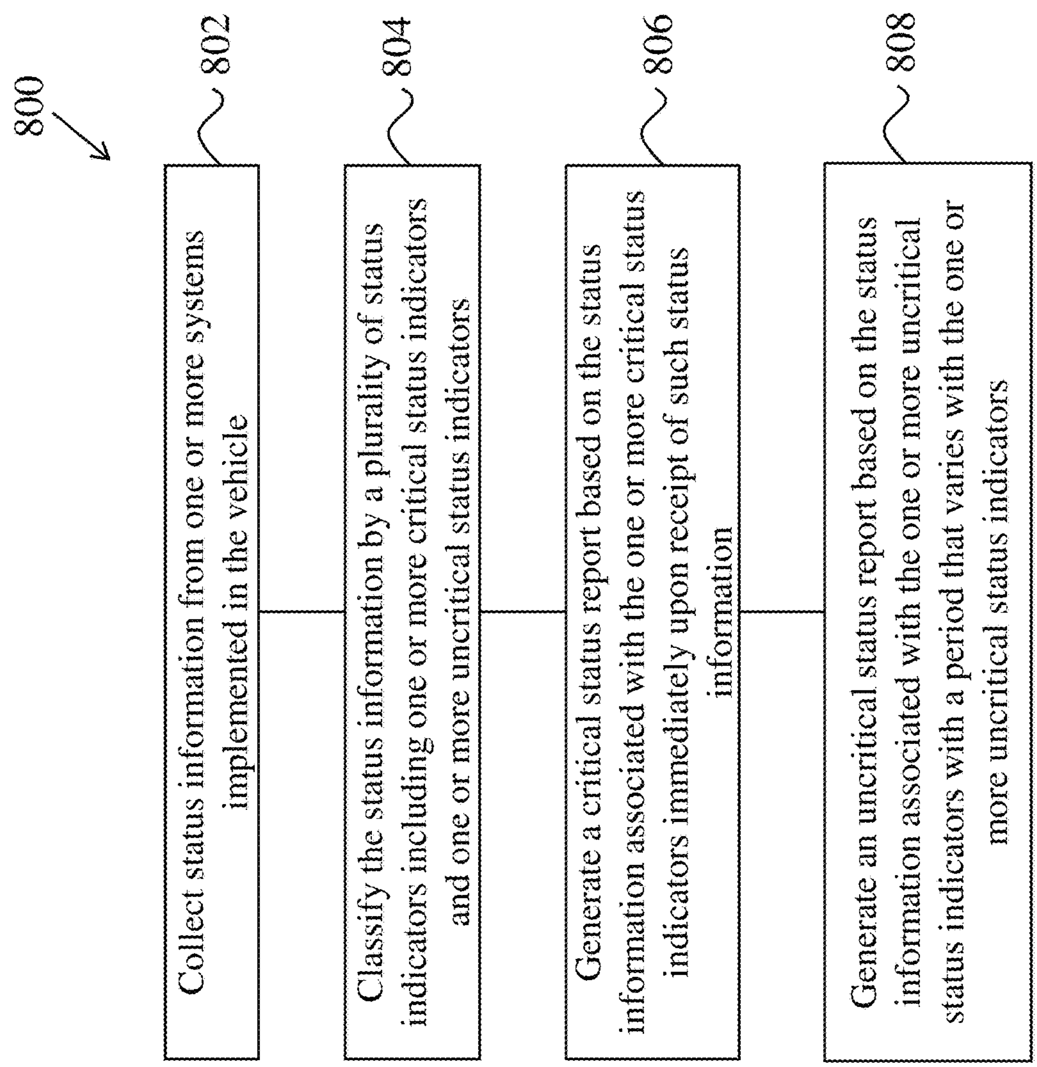
FIG. 8 shows a flowchart of another example method that may be implemented in a vehicle, for monitoring autonomous vehicle operation.

FIG. 8 shows a flowchart of another example method 800 that may be implemented in a vehicle, for monitoring autonomous vehicle operation. The method 800 includes, at step 802, collecting status information from one or more systems implemented in the vehicle, and at step 804, classifying the status information by a plurality of status indicators including one or more critical status indicators and one or more uncritical status indicators. Here, the one or more systems may include at least one sensor, at least one hardware system, and at least one software system. For example, the plurality of sensors comprises at least one of Global Positioning System (GPS) sensor, a radar sensor, a LIDAR sensor and a camera. In some embodiments of the disclosed technology, the one or more uncritical status indicators include a status indicator concerning vehicle basic dynamic information and warning messages from the one or more systems implemented in the vehicle. Here, the basic dynamic information includes a location of the vehicle, a fuel level of the vehicle, and an engine temperature of the vehicle. In some embodiments of the disclosed technology, the one or more critical status indicators include a status indicator concerning one or more of a hazardous weather condition, an unknown environment condition, and a lost communication with a monitor center. For example, the one or more critical status indicators include a status indicator concerning a condition that renders an operation of the vehicle unsafe. In this case, the method 800 further includes initiating an emergency parking function implemented in the vehicle, and sending a report indicating that the emergency parking function has been initiated.

The method 800 includes, at step 806, generating a critical status report based on the status information associated with the one or more critical status indicators immediately upon receipt of such status information. The method 800 includes, at step 808, generating an uncritical status report based on the status information associated with the one or more uncritical status indicators with a period that varies with the one or more uncritical status indicators. The method 800 may further include transmitting the uncritical status report over a high-speed channel for regular data transfers and transmitting the critical status report over a reliable channel for emergency situations.

Figure 9:
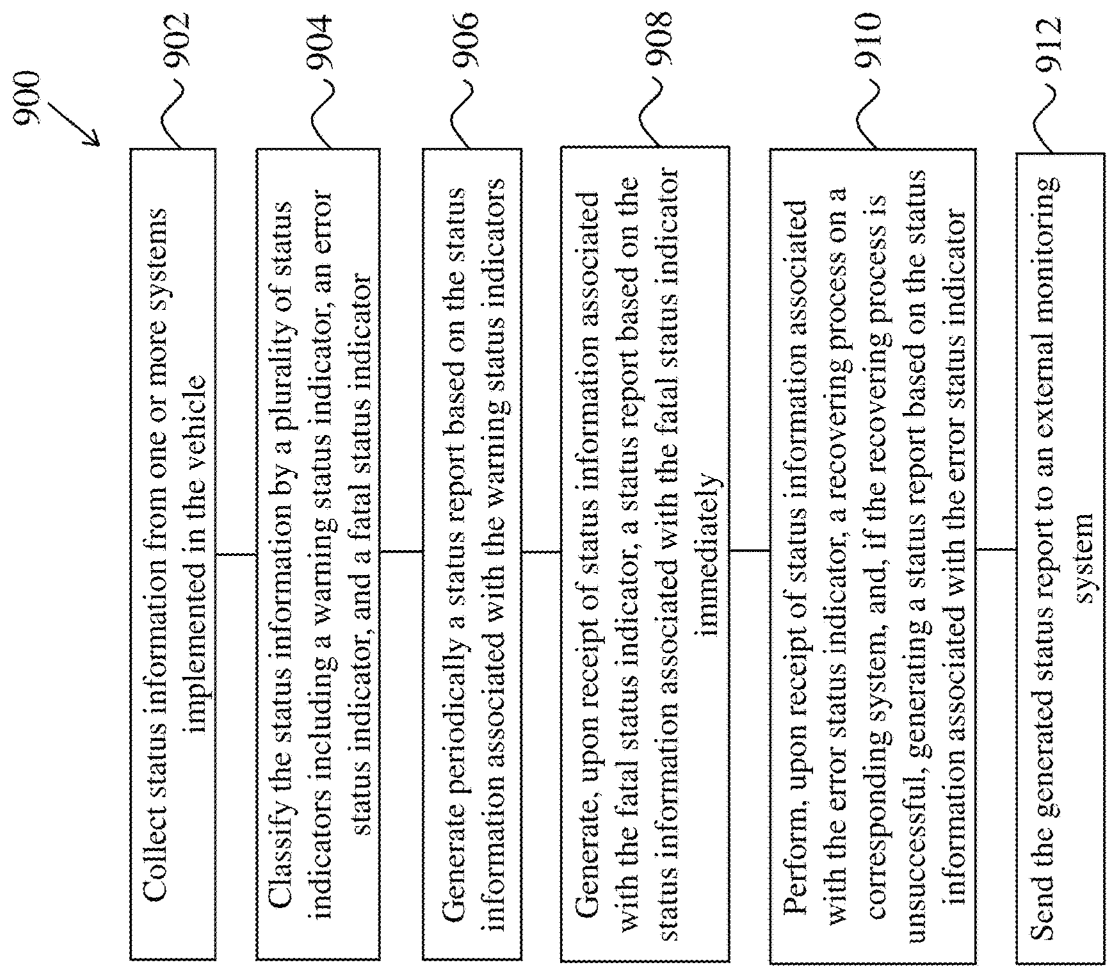
FIG. 9 shows a flowchart of another example method that may be implemented in a vehicle, for monitoring autonomous vehicle operation.

FIG. 9 shows a flowchart of another example method 900 that may be implemented in a vehicle, for monitoring autonomous vehicle operation. The method 900 includes, at step 902, collecting status information from one or more systems implemented in the vehicle. Here, the one or more systems include at least one sensor, at least one hardware system, and at least one software system. For example, the plurality of sensors comprises at least one of Global Positioning System (GPS) sensor, a radar sensor, a LIDAR sensor and a camera. The method 900 includes, at step 904, classifying the status information by a plurality of status indicators including a warning status indicator, an error status indicator, and a fatal status indicator. In some embodiments of the disclosed technology, the fatal status indicator includes a status indicator concerning one or more of a hazardous weather condition, an unknown environment condition, and a lost communication with a monitor center. For example, the fatal status indicator includes a status indicator concerning a condition that renders an operation of the vehicle unsafe. In this case, the method 900 further includes initiating an emergency parking function implemented in the vehicle, and sending a report indicating that the emergency parking function has been initiated.

The method 900 includes, at step 906, generating periodically a status report based on the status information associated with the warning status indicators. The method 900 also includes, at step 908, generating, upon receipt of status information associated with the fatal status indicator, a status report based on the status information associated with the fatal status indicator immediately. The method 900 also includes, at step 910, performing, upon receipt of status information associated with the error status indicator, a recovering process on a corresponding system, and, if the recovering process is unsuccessful, generating a status report based on the status information associated with the error status indicator. The method 900 also includes, at step 912, sending the generated status report to an external monitoring system. In some embodiments of the disclosed technology, the status report associated with the warning status indicator is transmitted over a high-speed channel for regular data transfers and the status report associated with the fatal status indicator is transmitted over a reliable channel for emergency situations.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed:

1. An apparatus comprising:

at least one processor; and at least one memory including computer program code, the at least one memory and the computer program code configured to, with the at least one processor, cause the apparatus to:

receive, from an electronic control unit of a vehicle, a test result comprising a result of a self test performed by the electronic control unit;

analyze the received test result to determine a vehicle status, the vehicle status comprising a status indicator and status information to be included in a report;

periodically transmit, to a remote system according to a first time period, a report including the vehicle status, a duration of the first time period being dependent on the vehicle status;

receive, from the remote system, a control command; and in response to the control command being received, implement the control command.

2. The apparatus of claim 1, wherein to analyze the received test result, the at least one memory and the computer program code are configured to, with the at least one processor, further cause the apparatus to select, based on the received test result, the vehicle status from one of a plurality of predetermined status values, each of the plurality of predetermined status values being associated with a corresponding status indicator and corresponding information to be included in the report.

3. The apparatus of claim 1, wherein the at least one memory and the computer program code are configured to, with the at least one processor, further cause the apparatus to periodically generate the report according to a second time period.

4. The apparatus of claim 1, wherein the control command is received from the remote system in response to the report being transmitted.

5. The apparatus of claim 1, wherein the report has a size dependent on the vehicle status included in the report.

6. The apparatus of claim 1, wherein to implement the received control command, the at least one memory and the computer program code are configured to, with the at least one processor, further cause the apparatus to override an implementation of a local control command.

7. The apparatus of claim 1, wherein the received control command comprises one of a plurality of predetermined control commands.

8. The apparatus of claim 1, wherein the test result comprises a result of a self test performed on a sensor.

9. The apparatus of claim 8, wherein the sensor comprises at least one of a global positioning system receiver, a radar, a light detection and ranging sensor, a camera, and an ultrasonic sensor.

10. The apparatus of claim 9, wherein the report is periodically transmitted via a first channel for a regular data transfer, and wherein the report is periodically transmitted via a second channel in response to an emergency situation.

11. The apparatus of claim 1, wherein to implement the received control command, the at least one memory and the computer program code are configured to, with the at least one processor, further cause the apparatus to cause the vehicle to decelerate, cause the vehicle to come to a safe stop, or modify a destination of the vehicle.

12. The apparatus of claim 1, wherein the at least one memory and the computer program code are configured to, with the at least one processor, further cause the apparatus to:

detect that communication to the remote system is compromised; and in response to the detection that the communication is compromised, periodically transmit the report to another vehicle, the another vehicle having a connection to the remote system.

13. A method, comprising:

receiving, from an electronic control unit of a vehicle, a test result comprising a result of a self test performed by the electronic control unit;

analyzing the received test result to determine a vehicle status, the vehicle status comprising a status indicator and status information to be included in a report;

periodically transmitting, to a remote system according to a first time period, a report including the vehicle status, a duration of the time period being dependent on the vehicle status;

receiving, from the remote system, a control command; and in response to receiving the control command, implementing the control command.

14. The method of claim 13, further comprising selecting, based on the received test result, the vehicle status from one of a plurality of predetermined status values, each of the plurality of predetermined status values being associated with a corresponding status indicator and corresponding information to be included in the report, wherein the corresponding status indicator comprises one of an OK status, a warning status, an error status, or a fatal status.

15. The method of claim 14, wherein the report has a size dependent on the vehicle status included in the report, wherein a size of a first report including an OK status is less than a size of a second report including a fatal status.

16. The method of claim 13, further comprising periodically generating the report according to a second time period, wherein the second time period is less than the first time period.

17. The method of claim 13, wherein the control command is received from the remote system in response to the report being transmitted, wherein the control command is received via a communication channel comprising at least one of a cellular data channel, a dedicated short range communication channel, or a communication air interface long and medium range channel.

18. The method of claim 13, wherein implementing the received control command comprises overriding a local control command, wherein overriding the local control command comprises at least one of causing the vehicle to decelerate or causing the vehicle to move toward a nearest service station.

19. The method of claim 13, wherein implementing the received control command comprises at least one of causing the vehicle to implement a defensive driving procedure or causing the vehicle to come to a safe stop.

20. A non-transitory computer-readable medium storing instructions that, when executed by at least one processor, cause operations comprising:

receiving, from an electronic control unit of a vehicle, a test result comprising a result of a self test performed by the electronic control unit;

analyzing the received test result to determine a vehicle status, the vehicle status comprising a status indicator and status information to be included in a report;

periodically transmitting, to a remote system according to a time period, a report including the vehicle status, a duration of the time period being dependent on the vehicle status;

receiving, from the remote system, a control command; and in response to receiving the control command, implementing the control command.

* * * * *